United States Patent [19]

Humphrey et al.

[11] 3,918,028

[45] Nov. 4, 1975

[54] HAND HELD OPTICAL READER

[75] Inventors: John H. Humphrey, Los Angeles; Edward Dillingham, Pacific Palisades, both of Calif.

[73] Assignee: Data Source Corporation, El Segundo, Calif.

[22] Filed: Jan. 5, 1973

[21] Appl. No.: 321,174

[52] U.S. Cl. .................... 340/146.3 F; 235/61.11 E
[51] Int. Cl. .......................... G06k 9/04; G06k 7/10
[58] Field of Search ...... 235/61.11 E; 250/219, 255, 250/266; 340/146.3 F, 146.3 H

[56] References Cited

UNITED STATES PATENTS

| | | | |
|---|---|---|---|
| 3,104,370 | 9/1963 | Rabinow | 340/146.3 F |
| 3,588,452 | 6/1971 | Kee | 340/146.3 F |
| 3,637,993 | 1/1972 | Christie et al. | 235/61.11 E |
| 3,673,416 | 6/1972 | Berler | 235/61.11 E |
| 3,685,723 | 8/1972 | Berler | 235/61.11 E |
| 3,735,142 | 5/1973 | Harr et al. | 235/61.11 E |
| 3,735,350 | 5/1973 | Lemelson | 235/61.11 E |
| 3,737,629 | 6/1973 | See | 235/61.11 E |
| 3,777,165 | 12/1973 | Bryant et al. | 250/555 |

*Primary Examiner*—Daryl W. Cook
*Attorney, Agent, or Firm*—Seidel, Gonda & Goldhammer

[57] ABSTRACT

A hand held optical reader in which indicia on a surface may be read by moving the reader across the surface. The hand held reader includes a light source and light detectors mounted within the handle of the reader. A read head pivotally mounted to the handle is connected to the light source and light detectors by means of optical fibers. A pair of guide wheels on the read head maintains the read head a predetermined distance from the surface being read and causes the read head to track in a straight line. The read head is provided with an array of optical sensors which are mounted in alignment in a row. The number of optical sensors provided in the read head exceeds the number required for reading. This substantially decreases the need for careful alignment of the read head with a line of indicia to be read. Selected outputs of the optical sensors are used to identify the indicia or character being read depending upon the outputs of the optical sensors.

The purpose of the above abstract is to provide a non-legal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

20 Claims, 13 Drawing Figures

BARS TO MAKE CHARACTER

| CHARACTER | HORIZONTAL TOP 72a | HORIZONTAL MIDDLE 72d | HORIZONTAL BOTTOM 72g | | VERTICAL TOP LEFT 72b | VERTICAL TOP RIGHT 72c | | VERTICAL BOTTOM LEFT 72e | VERTICAL BOTTOM RIGHT 72f |
|---|---|---|---|---|---|---|---|---|---|
| 0 | X | | X | | X | X | | X | X |
| 1 | | | X | | | X | | | X |
| 2 | X | X | X | | | X | | X | |
| 3 | X | X | X | | | X | | | X |
| 4 | | X | | | X | X | | | X |
| 5 | X | X | X | | X | | | | X |
| 6 | | X | X | | X | | | X | X |
| 7 | X | | | | | X | | | X |
| 8 | X | X | X | | X | X | | X | X |
| 9 | X | X | | | X | X | | | X |
| | Q | R | S | | T | | | U | |

HAND HELD OPTICAL READER

BACKGROUND OF THE INVENTION

The present invention relates to a hand held optical reader. More particularly, the present invention relates to a hand held optical reader which may be used for reading printed indicia on flat or curved surfaces and which does not require close alignment with the indicia to be read.

There has been a long felt need, particularly in the merchandising industry, for a hand held reader capable of accurately reading tags, labels, and other surfaces containing printed indicia, which may for example be indicative of the merchandise being sold and the price. The indicia on the tags, labels or other surfaces should be capable of being read by both human beings and machines. Attempts in the past have been made to develop hand held readers operating on magnetic principles or reading coded optical indicia in addition to indicia which is humanly readable. However, the cost of producing tags and labels using magnetic materials and additional optical codes is too expensive. Furthermore, the magnetic material or optical codes forming the indicia is not readable by human beings.

Summary of the Invention

The present invention provides numerous advantages over the prior art. The present invention provides a hand held optical reader which does not have to be accurately aligned with the indicia or characters being read. The present invention provides a means of maintaining the read head of the reader a predetermined distance from the surface having the indicia being read. In a preferred embodiment, this means is a pair of wheels. The rotation of the wheels helps the reader to move in a straight line parallel to the horizontal axis of the characters being read.

A further advantage of the present invention is the provision of the read head being pivotally mounted to the handle of the hand held reader in order to provide a pivotal action which allows the read head to remain substantially parallel to the surface being read even though the handle may be tipped upwardly or downwardly.

The present invention provides the advantage of being capable of reading curved as well as flat tags, labels or other surfaces. Furthermore, the present invention may be used in reading non-rigid labels which may curve, flex or bend slightly as they are being read. Such tags and labels occur commonly on packaged articles of clothing in retail stores. For example, such a flexible label may be contained on a shirt package. Such a label may curve, bow or flex slightly as it is being read. The present invention enables the reading of such labels or tags accurately.

Briefly, in accordance with the present invention, a hand held optical reader is provided for reading indicia on a surface. The optical reader comprises a handle, a light source and a predetermined number of light detectors. The read head is connected to the handle. The read head is provided with a means for mounting one end of each of a first and second predetermined number of optical fibers. A first predetermined number of optical fibers, each having one end mounted in said read head, transmits light from the light source to the read head. A second predetermined number of optical fibers, each having one end mounted in the read head, transmits light from the read head to the light detectors. The predetermined number of optical fibers is greater than the number required to read a character or indicia.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figures 1, 2:
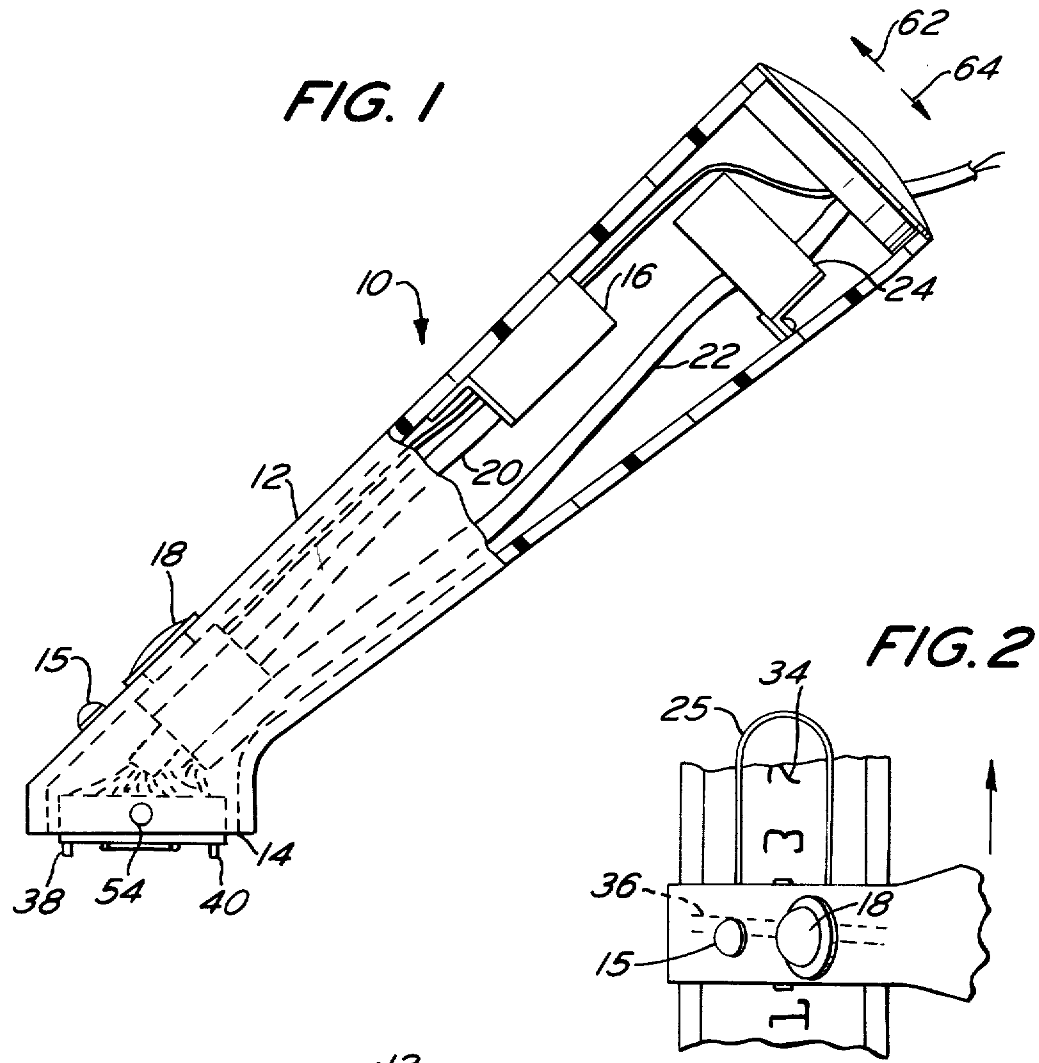
FIG. 1 is a partially cutaway side view of a hand held optical reader in accordance with the present invention.
FIG. 2 is a top view of a portion of the hand held optical reader scanning indicia in accordance with the present invention.

Referring now to the drawings in detail, wherein like numerals indicate like elements, there is shown in FIG. 1 a hand held optical reader 10 provided with a handle 12 and a read head 14. The handle 12 is hollow and is provided with a light source 16. The actual light source is not shown since such a light source may be any suitable conventional light source, such as a light bulb. Light source 16 is turned on and off via on/off switch 18.

The light from light source 16 is transmitted to read head 14 via optical fibers 20. In a preferred embodiment being illustrated, there are 24 optical fibers. However, it is understood that more or less optical fibers may be used as desired. The number 24 has been selected only by way of example, and not by way of limitation. The ends of optical fibers 20 are shown mounted in read head 14 in FIG. 3.

Optical fibers 22 transmit light reflected from the surface being read at read head 14 to a photodetector array 24 located in handle 12. If desired, the photodetector array 24 may be located outside of the handle 12 in a separate terminal or enclosure. Since the optical fibers 22 are flexible, they can easily extend out of the handle and connect to the photodetector array. Each one of the optical fibers 22 corresponds to and forms a pair with one of the optical fibers 20. In other words, the end of one optical fiber 20*a* and the end of another optical fiber 22*a* form a sensor unit.

The optical reading of a hand held optical reader of the present invention may be better understood by reference to United States patent applications Ser. No. 241,180 filed Apr. 5, 1972 by John H. Humphrey, and Ser. No. 229,922 filed Feb. 28, 1972 by Edward Dillingham and Frederick William Schmidt, now abandoned, both assigned to the assignee of the present invention. Application Ser. No. 229,922, filed Feb. 28, 1972 has been abandoned in favor of continuation application Ser. No. 445,706, filed Feb 25, 1975. The subject matter of these patent applications is incorporated herein by reference.

Figure 3:
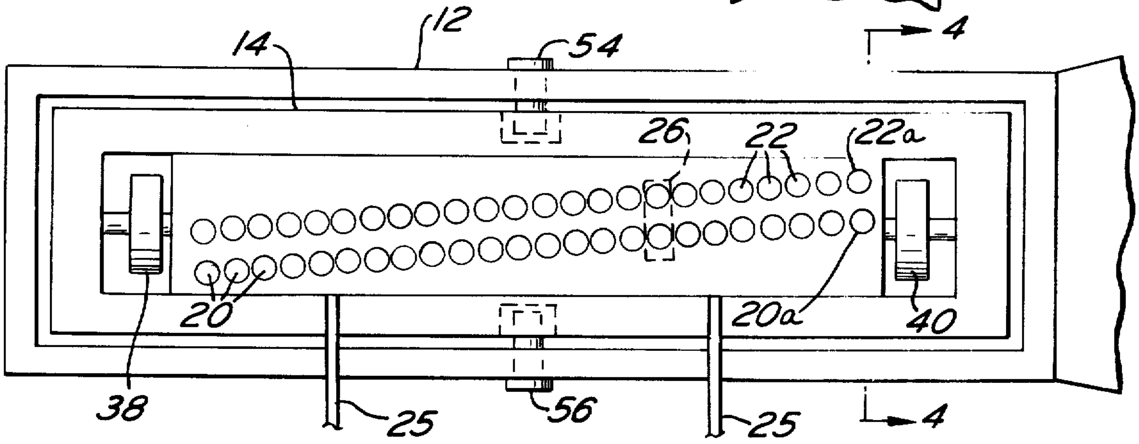
FIG. 3 is a bottom view of the read head and supporting structure of the hand held optical reader in accordance with the present invention.

Referring now to FIG. 2, there is shown a portion of the hand held optical reader scanning a line of characters 34. It may be noted from FIG. 2, that the array 36 of sensor units 26 shown in dotted lines is considerably greater in size than the height of the indicia 34 to be read. Since only some of the sensor units 26 are needed to read a character, exact alignment of the sensor units 26 with the characters to be read is not necessary. In one specific example, the reading of the indicia or characters requires only 9, 10 or 11 of the sensor units 26. Read head 14 is provided with 24 sensor units 26. Therefore, the outputs of any 9, 10 or 11 sensor units 26 may be selected to provide the reading information to recognition circuitry. As shown in FIGS. 2 and 3, a wire guide 25 is provided projecting forward from the read head 14 to aid the operator in initially aligning the read head sensors with the line of characters to be read and in maintaining the characters in alignment with sensor array 36 during scanning. Typically, the guide 25 may encompass an area greater in height than the height of characters 34, but less than the length of array 36. This is to provide extra tolerance for operator misalignment even though the guide 25 encourages the operator to keep the characters within the field encompassed by guide 25 during scan.

Figure 4:
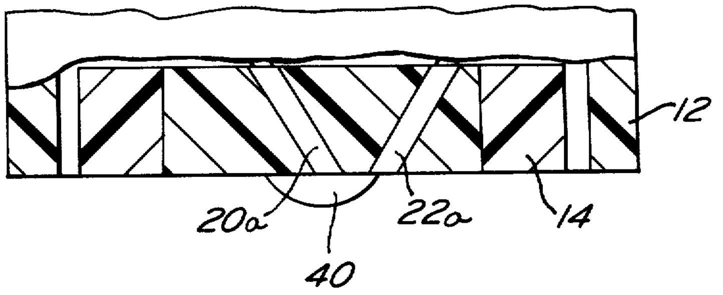
FIG. 4 is a cross sectional view taken along line 4—4 of FIG. 3 of the read head.

It is necessary that the sensors 26 be maintained within a predetermined distance or range of distance from the surface of the indicia and be substantially parallel to the surface for accurate reading results. This is accomplished as shown in FIGS. 3 and 4 by having a pair of wheels 38 and 40 on a common axis 41, which is substantially perpendicular to the direction of scan or the direction of movement of the read head as it is moved over a line of characters to be read.

The read head 14 is pivotally mounted to the handle 12 by pins 54 and 56. The pins 54 and 56 allow the handle 12 to be moved up and down relative to the read head as indicated in FIG. 1 by arrows 62 and 64. This permits the bottom surface of the read head to remain parallel with the surface being read even though the handle may be moved up or down by the operator. In operation, the handle is held by an operator and the read head is placed on the surface of the paper approximately in line with and adjacent to the lefthand character to be read. Because the read head is allowed to tilt about pins 54 and 56 freely, both wheels 38 and 40 will remain in contact with the paper. Thus, the sensors will be held a predetermined distance from the indicia. as controlled by the relation of the wheels 38 and 40 in relation to the ends of the fibers which constitutes the sensors.

When the operator places the read head in contact with a surface, an angle of tilt along the axis 41 of the wheels may also occur. Several degrees of tilt can be tolerated in this manner so long as the wheels continue to touch the surface on which the indicia is printed. The combination of the tilt about the pins 54 and 56 and the tilt permitted about the axis 41 of the wheels 38 and 40 constitutes a universal gimballing action which permits ease of operation. This provides a significant advantage in that the hand held optical reader can be held comfortably by an operator in different positions without affecting reading accuracy. Also, this permits the operator to move the reader rapidly over the characters to be read without using excessive care to keep the read head parallel to the surface. For example, when the reader is used in a high volume, mass merchandising retail establishment, it is expected and desired that the hand held reader be rapidly moved over the tags and labels of various items at a checkout or point of sale counter or when taking inventory. This feature in conjunction with the absence of a need for an accurate alignment of the sensors with respect to the characters to be read allows rapid operation by relatively unskilled operators which is a necessity in today's market place.

Figures 11, 13:
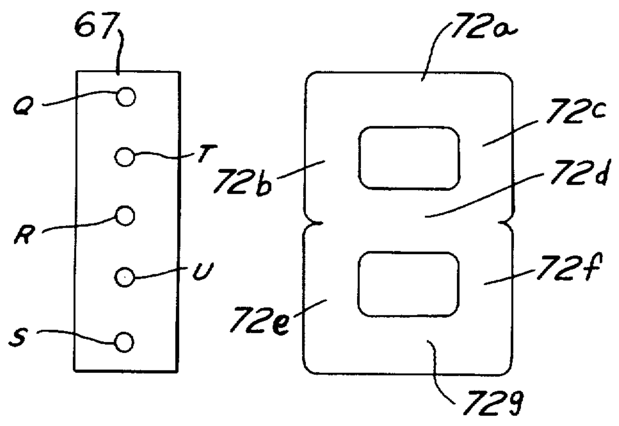
FIG. 11 is a drawing showing a simplified set of sensor units in relation to the reading character.
FIG. 13 is a chart showing which of the seven basic bars are detected in a scan of each of the ten numerals of the font illustrated in FIG. 12.

Referring now to FIG. 11, there is shown a simplified array of sensors which illustrate the basic reading process utilized in the present invention. A scan head 67 comprises two sets of detectors of the type shown in FIG. 4. The first set of detectors comprises three detectors identified as Q, R and S establishing what is termed to be Q, R and S channels of the head. The second set of detectors comprises two detectors identified as T and U establishing what is termed the T and U channels of the head. Detectors Q, R and S are aligned, respectively, with the top, middle and bottom horizontal bars of the font being used. This is illustrated in FIG. 11 by the numeral "8" positioned to the right of the scan head 67. In particular, detector Q is aligned with the top horizontal bar 72*a;* the detector R is aligned with the middle horizontal bar 72*d;* and detector S is aligned with the bottom horizontal bar 72*g*. The detector T is positioned approximately halfway between detectors Q and R and will detect the presence or absence of vertical bars 72*b* and 72*c*. Detector U is positioned halfway between detectors R and S and detect the presence or absence of vertical bars 72*e* and 72*f.*

The numeral 8 has been chosen since it contains all of the elements sufficient for constructing all of the numerals "1" "2", "3", "4", "5", "6", "7", "8", "9" and "0" as may be determined by examination of FIG. 11. Thus, the numeral 8 can be broken down into particular elements representative of each of the numerals from 1 through 0. Based on that proposition, it is possible to determine the presence of a particular numeral by detecting at any particular instance the presence or absence of particular elements of the numeral. From the foregoing, logic circuitry responsive to any detection means can be applied for the purpose of generating information in machine language to be used by a central computer or other memory device.

Analyzing the foregoing, it can be observed that the character provided for the credit card, passbook, product tag, label, etc. must be in a format that is readable by both human observers and machines. The approach adopted herein, at least for numerals, is to employ a font made up of seven basic segments, elements or bars, three of which are horizontal (top, middle, and bottom) and four of which are vertical (top-left, top-right, bottom-left, and bottom-right). It is to be noted that the basic segments, elements or bars may be straight or curved. For the purposes of explanation herein, however, these segments are depicted as being straight.

A character wherein all seven basic bars are present is in the shape of the numeral 8; that is, an observer inspecting such a character would visually interpret the character as the numeral 8. The numerals 1 through 0 are each made up of unique combinations of the seven bars of the font arranged in the shape of the numeral in question, and are readably identifiable by an observer.

In an electronic character recognition system, the character being scanned can be identified if it is possible to establish which of the seven basic bars are present in the character. Thus, if the scanned character is found to have all seven bars present, it may be concluded properly that the character is the numeral 8. If the scanned character, on the other hand, is found to have all bars present but the middle horizontal bar, it may be concluded promptly that the character being scanned is the numeral 0.

Figure 12:
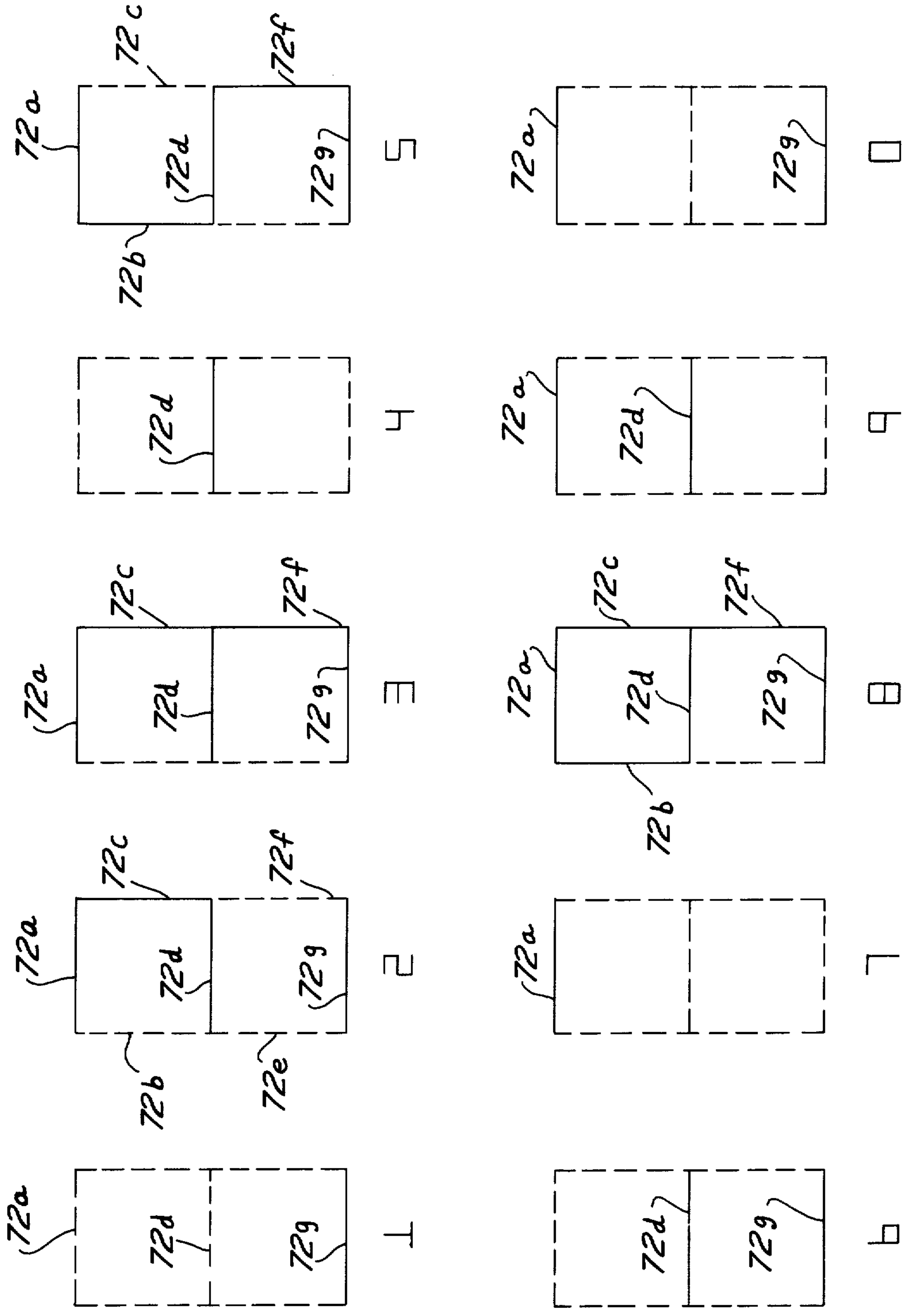
FIG. 12 illustrates a font of type to be read.

Analysis of the font shown in FIG. 12 makes it immediately clear that any one of the numerals 1, 4, 6, 7, 9 and 0 can be distinguished between themselves by the presence or absence of one of the three horizontal bars 72*a*, 72*d* and 72*g*. For example, the numeral 1 can be distinguished from the numeral 4 by the presence of the horizontal bar 72*g* and the absence of the horizontal bars 72*d* and 72*a* which are present in some combination in the numerals 4, 6, 7, 9 and 0. In a like manner, the numeral 4 can be distinguished by the presence of the horizontal bar 72*d* which is absent from or appears in combination with other horizontal bars 72*a* and 72*g* in the numerals 1, 6, 7, 9 and 0. Further analysis shows that the numeral 7 requires only the horizontal bar 72*a* to distinguish it. In a like manner, the numerals 6, 9 and 0 require two of the three horizontal bars to distinguish them.

From the foregoing, it is apparent that the numerals 1, 4, 6, 7, 9 and 0 can be detected by arranging light conducting rods, light sources, and photosensors to determine the presence or absence of the horizontal bars 72*a*, 72*d* and 72*g* as each numeral is scanned by the read head 67.

The detection of the numerals 2, 3, 5 and 8 requires the use of one or more of the vertical bars which define the numeral 8 because of each of these latter numerals includes the three horizontal bars. Examination of FIG. 11 indicates that the numeral 2 can be distinguished from the numerals 3, 5 and 8 by detecting the presence of the three horizontal bars 72*a* 72*d* and 72*g*, the presence of the vertical bar 72*c*, and the absence of the vertical bars 72*b* and 72*f*. In a like manner, the numeral 3 can be distinguished from the numerals 2, 5 and 8 by detecting the presence of the three horizontal bars 72*a*, 72*d* and 72*g*, the presence of the vertical bars 72*c* and 72*f*, and the absence of the vertical bar 72*b*. The numeral 5 is distinguished from the numerals 2, 3 and 8 by detecting the presence of the three horizontal bars 72*a*, 72*d* and 72*g*, the presence of vertical bars 72*b* and 72*f* and the absence of the vertical bar 72*c*. Finally, the numeral 8 is distinguished from the numerals 2, 3 and 5 by detecting the presence of the three horizontal bars 72*a*, 72*d* and 72*g* and the presence of the vertical bars 72*b*, 72*c* and 72*f*.

From the foregoing, it should be obvious that each of the numerals from 1 through 0 can be distinguished from each of the other numerals by detecting the presence or absence of one of the six bars 72*a*, 72*d*, 72*g*, 72*b*, 72*c* and 72*f*.

A logic chart as shown in FIG. 13 indicates the presence or absence of each of the bars 72*a* through 72*f* indicated with special reference to detectors Q, R, S, T and U.

It should be recognized by those skilled in the art that the foregoing discussion is only exemplatory and that other fonts made up of other combinations of horizontal and vertical lines may be utilized without departing from the spirit or scope of the present invention. It should further be recognized that other logic rules may be developed to determine the identity of each character using an analysis similar to that recited above.

Figure 5:
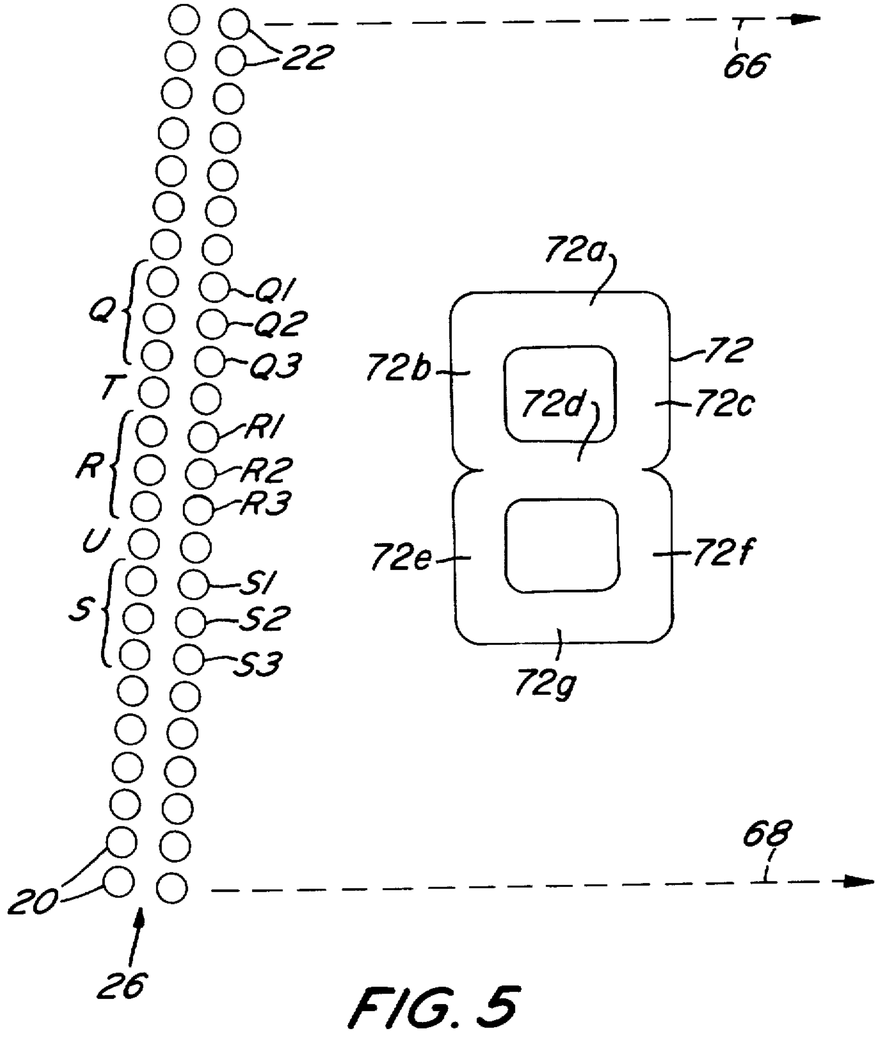
FIG. 5 is a drawing showing the sensor units in relation to the reading of a character.
Figure 6:
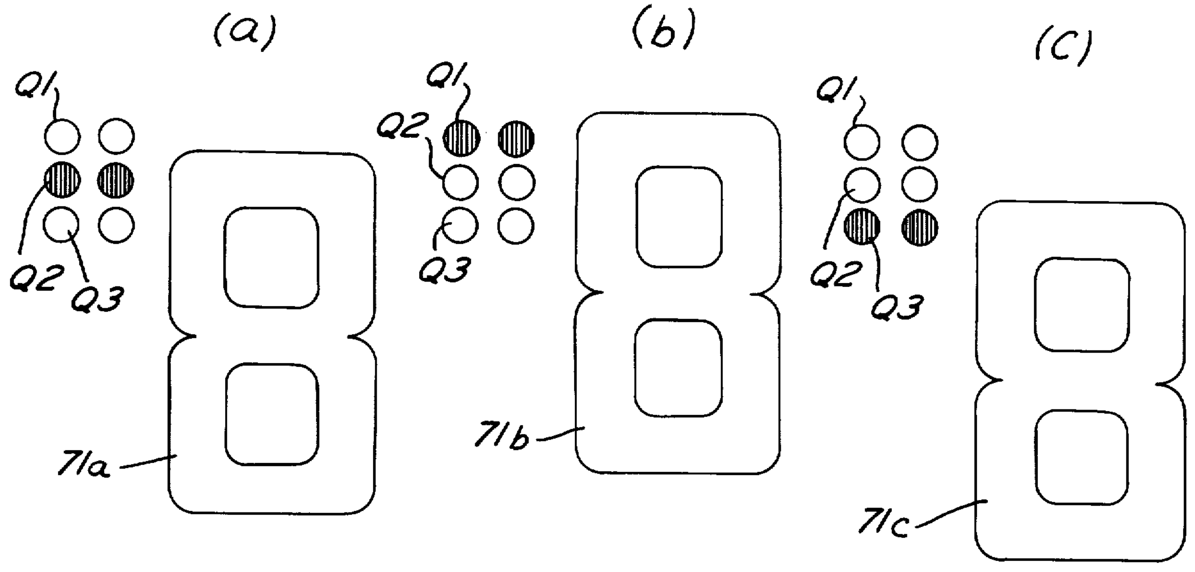
FIG. 6 is a drawing of three coupled sets of sensors illustrating a feature of the present invention.
Figure 7:
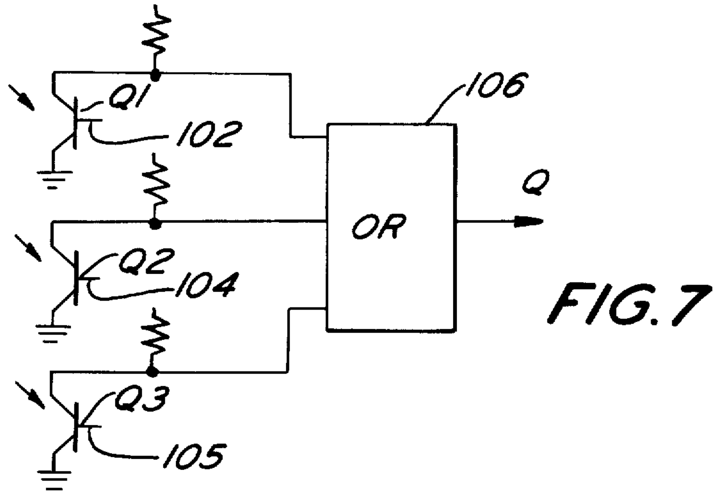
FIG. 7 is a schematic diagram, partially in block diagram form, of circuitry for implementing the embodiment of FIG. 6 in accordance with the present invention.

Referring now to FIG. 5, there is shown an illustration of a slanted array or line of sensors 26 scanning character 72 which is shown as a figure eight for the purpose of illustration. The array of sensors forms two aligned rows, which rows are slanted or tilted to the right away from a line perpendicular to the direction of scan indicated by arrows 66 and 68. The slanted array of sensors 26 is moved, guided by wheels 38 and 40, in the direction of dotted arrows 66 and 68. As the sensors 26 are moved over the character to be read, one of the sensors, due to the slant of the sensors as mounted in read head 14, will contact the character first. In the specific example being illustrated, sensor Q1 would be the first sensor to be darkened or sense the change in reflectivity caused by the darkness of the character in relation to the surface. The first sensor to be darkened is then designated as the top sensor of a group of 11 sensors Q1 through S3. These sensors will receive the information for character recognition purposes. The group of 11 sensors is assigned temporarily for each character being read. Sensors Q1, Q2 and Q3 will collectively be called Q, likewise R1, R2 and R3 will be called R, and S1, S2 and S3 will be called S. The Q sensors sense the presence or absence of the upper horizontal bar, such as 72*a*, of a character. The R sensors sense the presence or absence of the middle horizontal bar, such as 72*d* of a character. The S sensors sense the presence or absence of the lower horizontal bar, such as 72*g*, of a character. The T sensor senses the presence or absence of the upper right and left vertical bars, such as 72*b* and 72*c*, of a character. The *U* sensor senses the presence or absence of the lower right and left vertical bars, such as 72*e* and 72*f*, of a character. While we refer to 11 sensors being used to read a character, depending on the position of the character relative to the group of sensors Q1 through S3, several of the sensors, such as S2 and S3 may not see the character, thus only 9 sensors may actually be used in reading a character. The outputs of Q1, Q2 and Q3 are electronically coupled in such a manner that any darkening of either Q1, Q2 or Q3 will result in a Q output indicating the presense of an upper horizontal bar. The R and S sensors are each coupled similarly. This coupling arrangement is described more fully hereinafter and is shown in FIGS. 6 and 7. Thus, Q, R, S, T and U signals can be obtained as a character is scanned and in accordance with the above mentioned application Ser. No. 229,922, suitable logic circuitry can recognize and identify the characters to be read.

While as described above the first sensor to contact a character has been selected to be Q1, if desired the first sensor to detect the upper corner of a character may be selected as the Q2 sensor thereby permitting selection or identification of the Q1 through S3 sensors. This insures that the character to be read is covered by the group of the Q1 through S3 sensors even though the operator may not scan straight across the character. The selection of the sensors 26 or the output signal of the sensors 26 which are to be used for character recognition may be accomplished by a number of different methods. While the method for selecting the sensors by locating Q1, the first sensor of a slanted array to be darkened by a character as described above, it is apparent that other methods may be used, such as storing the output from all 24 sensor units in a memory and then selecting the group of outputs which will be used in character recognition.

As may be seen from FIGS. 3 and 5, the line formed by the array of sensor units 26 forms an angle to the direction which is perpendicular to the direction of scan or movement of the read head. This angle insures that the upper left corner of the character to be read will be the first portion of the character to be detected, thus determining the Q1 sensor. However, this is only a specific example and is not intended to be a limitation. It will be apparent to those skilled in the art that the angle of the array of sensors may be reversed so that the lower left portion of the character will always be the first one to be detected, providing that a font is used in which every character has a lower left corner. Alternatively, as discussed hereinafter the array of sensors need not be tilted or angled at all.

Figure 8:
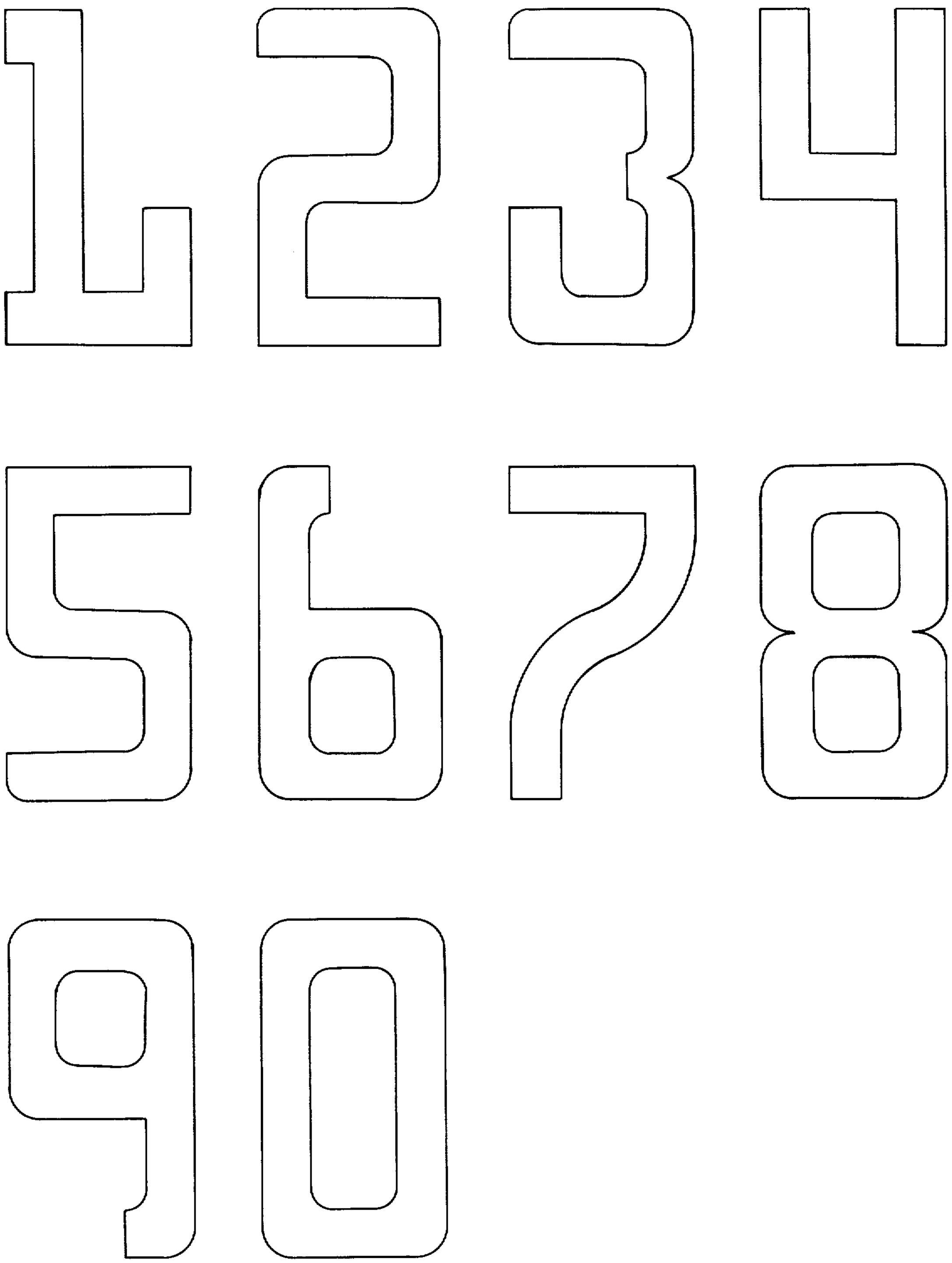
FIG. 8 is a drawing of the numerals of a font used in accordance with the present invention.

There is shown in FIG. 8 a font which may preferably be used with the tilted array of sensors shown in FIGS. 3 and 5. The font shown in FIG. 8 is unique in that every numeral has an upper left hand corner which is used to identify the Q1 sensor. The numerals shown in FIG. 8 therefore provide a proper start or sensor selection signal when the array of sensor units 26 is tilted or slanted as shown in FIGS. 3 and 5.

Referring to FIG. 6, the advantage of coupling two or more sensors to act as one sensor for the horizontal detectors Q, R and S is readily apparent. A variation in vertical alignment after the reading of a single character has been started is permitted because at least one of the coupled sensors will remain over a horizontal bar of the character being read. There is shown in FIG. 6 three sensor units Q1, Q2 and Q3 which may be combined by the circuitry as shown in FIG. 7 to function as a single sensor unit, such as the Q sensor. As the scan of the character 71*a* begins, assume the Q2 sensor is darkened. As the scan continues, because of operator movement of the reader downwardly or vertical misalignment or skew of the character uppwardly, only Q1 may be darkened as shown with respect to character 71*b*. Likewise, if the operator moves the reader upwardly or if there is vertical misalignment or skew of the character downwardly as indicated by character 71*c*, then only Q3 may be darkened. Thus, by coupling two or more sensors together, sufficient tolerance is allowed to insure accurate reading of a character.

Referring to FIG. 7, there is shown one possible circuit for combining a plurality of sensor units to function as a single sensor unit. There is shown in FIG. 7 three phototransistor circuits 102, 104 and 105. Phototransistor circuit 102 may correspond to the photodetector for the Q1 sensor unit. Phototransistor circuits 104 and 105 may correspond respectively to the photodetector circuit for the Q2 and Q3 sensor units. The outputs of phototransistor circuits 102, 104 and 105 are combined in OR circuit 106. OR circuit 106 produces an output when an element or character is detected by either phototransistor circuit 102, 104 or 105 or by two or more of phototransistor circuits 102, 104 and 105. Of course, any number of sensor units may be combined in this manner.

Figure 9:
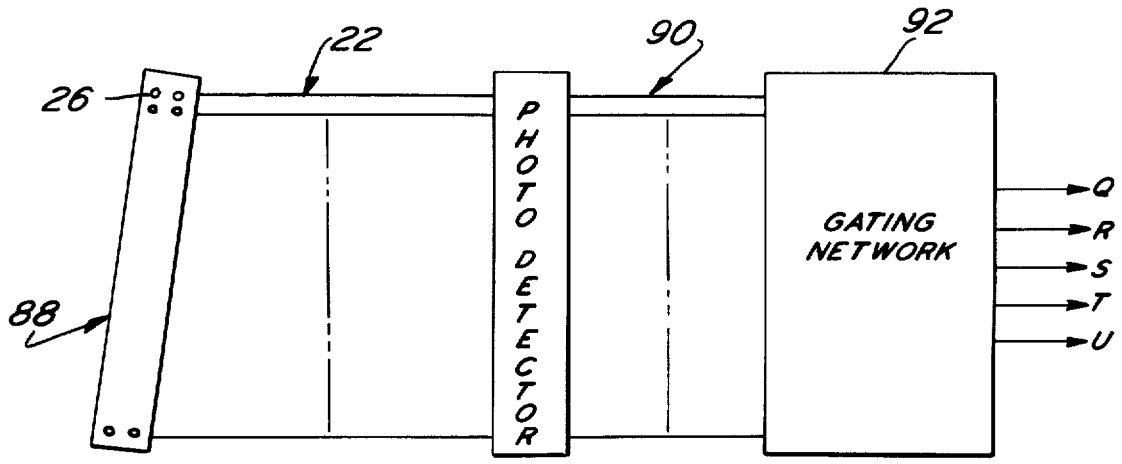
FIG. 9 is a schematic diagram, in block diagram form, of circuitry in accordance with one embodiment of the present invention.

Referring now to FIG. 9, there is showwn an array of sensor units 88 comprised of a plurality of individual sensor units 26. The output of each of the sensor units 26 is transmitted to photodetector array 24 via twenty-four individual optical fibers 22. The output of the photodetector array 24 is transmitted via twenty-four lines 90 to gating network 92. Gating network 92 gates five outputs, labeled Q, R, S, T and U depending upon which of its 24 inputs changes first in response to the detection of a dark level.

Figure 10:
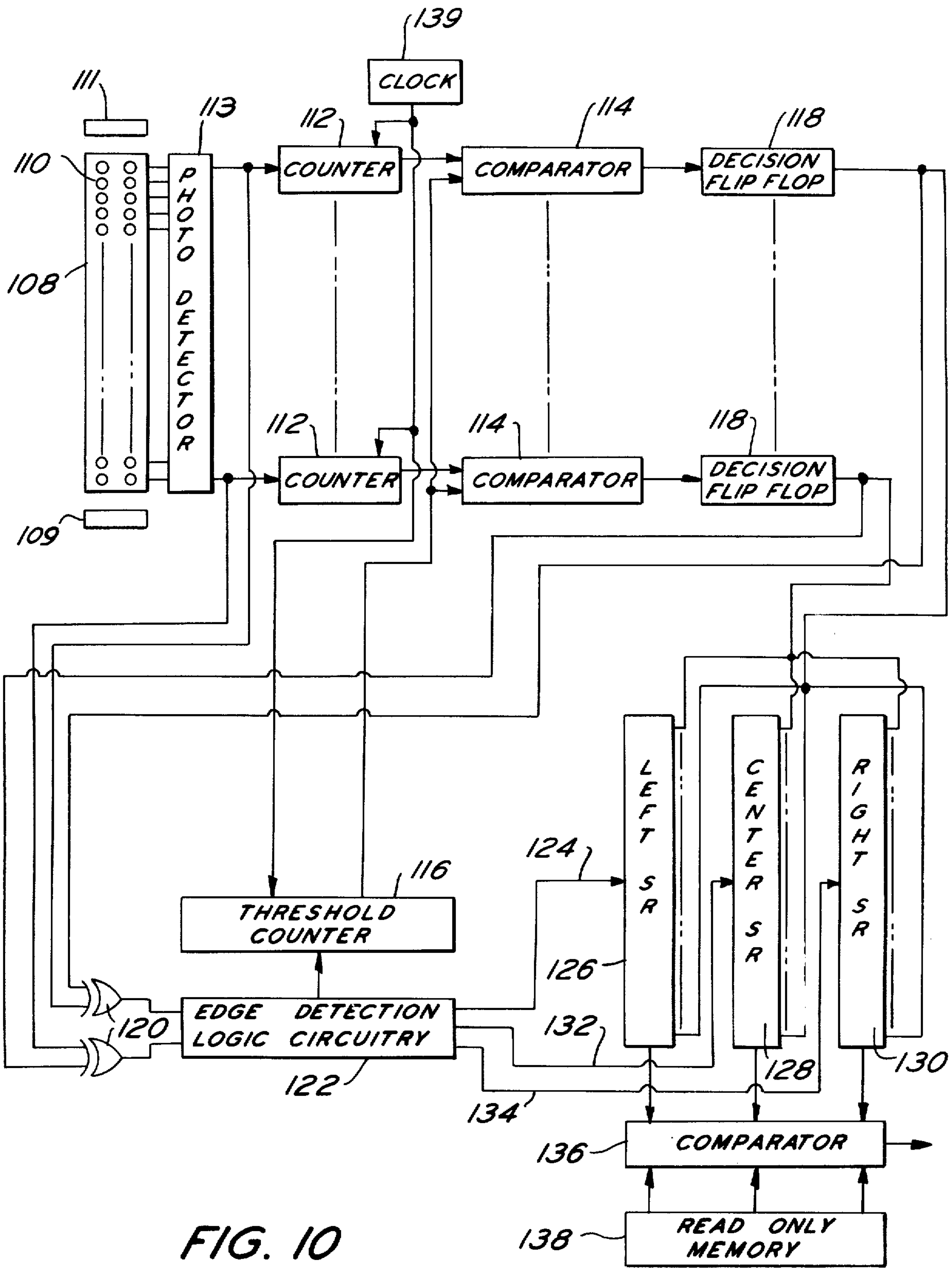
FIG. 10 is a schematic diagram, in block diagram form, of circuitry in accordance with another embodiment of the present invention.

Referring now to FIG. 10, there is shown another embodiment of the present invention wherein the line of sensory need not be slanted away from perpendicular with respect to the direction of movement of the hand held optical render. There is shown in FIG. 10 a read head having an array of sensor units 108 with the sensor units 110 in the sensor unit array 108 being substantially perpendicular to the direction of movement of the read head of the hand held optical reader. In other words, the slanting or tilting of the sensor unit array as previously described is not required.

The outputs of sensors 110 are fed to photodetectors 113 and then to counters 112 which may be 8 bit counters. A counter 112 is provided for each sensor unit 110. When a sensor unit 110 detects darkness or the absence of reflected light, the counter 112 is counted up one count at each clock time from the clock 139. If the sensor 110 is illuminated, the counter 112 is reset to zero.

The output of each counter 112 is fed to a comparator circuit 114. The output of the counter circuit 112 is compared in the comparator circuit with the output of a threshold counter 116. If the count of counter 112 is greater than or equal to the count in threshold counter, the decision flip-flop 118 corresponding to the specific counter 112 is set.

The outputs of sensor units 110 are also fed to exclusive OR gates 120. Exclusive OR gates 120 also receive inputs from the decisions flip-flop circuits 118. The outputs of exclusive OR gates 120 are fed to edge detection logic circuitry 122. A dark edge is detected when a sensor output indicates the detection of dark and the decision flip-flop 118 for that sensor 110 is zero or, in other words, the decision flip-flop has not been set. The edge detection logic circuitry looks for two sensor units 110 to detect the dark edges and subsequently for three or more sensor units to detect darkness, that is, the absence of reflected light. When the edge detection logic circuitry detects these conditions, a load command signal is generated on line 124 which causes left shift register 126 to be loaded with the output of all of the decision flip-flops 118. In a preferred example, there are twenty-four decision flip-flops 118 corresponding to 24 sensor units 110. The shift registers 126, 128 and 130 are each twenty-four stage parallel input shift registers. However, as in the other embodiments of the present invention disclosed herein, any other suitable number of sensor units 110 and associated circuitry may be selected as desired.

The command load signal on line 124 is present when the array of sensor units 108 is over the left vertical column of the character being read. As the array of sensor unit 108 continues to scan the character, edge detection logic circuitry 122 looks for one of the two following conditions: (1) any two sensor units which previously detected a dark condition, now detecting a light condition or (2) any three adjacent sensor units which previously detected a dark condition now detecting a condition wherein the two outside sensors detect a dark condition and the center sensor unit detects a light condition. If either of the above two conditions is detected by edge detection logic circuitry 122, the command load signal is removed from line 124 and a command load signal appears on line 132. The command load signal on line 132 causes center shift register 128 to be loaded with or to store the output conditions of the decision flip-flops 118.

Once the center shift register 128 is loaded with the outputs of decision flip-flops 118, edge detection logic circuitry 122 looks to detect the right-hand column of the character being read. The right-hand column of the character being read is detected by edge detection logic circuitry 122 when either of the following two conditions is detected: (1) any two sensor units 110 which previously detected light conditions, now detect dark conditions, or (2) at least four adjacent sensor units 110 detect a dark condition. If either of these two conditions are detected by edge detection logic circuitry 122, a load command signal is generated on line 134 which causes the output states of decision flip-flops 118 to be loaded or entered into right shift register 130. At this time, left shift register 126 will contain the signals corresponding to the left column of the character read, center shift register 128 will contain the signals corresponding to the horizontal bars of the character read and right shift register 130 will contain the signals corresponding to the right column of the character read. However, the character read may occupy only between eight and eleven bit positions in the shift register 126, 128 and 130. However, it is understood that the number of bit positions occupied by the signals generated by reading the character will vary depending upon the number of sensor units 110 used and the size of the characters being read.

When all of the sensor units 110 detect a light condition, this indicates that the character has been read because the sensors are now over the space before the next character. The information stored in shift registers 126, 128 and 130 is then serially shifted out and compared in comparator 136 with character patterns stored in read only memory 138. As the information is shifted out of shift registers 126, 128 and 130, the data shifted out of these shift registers is ignored where the data in all three shift registers indicates the detection of white by the sensor units. This is continued until at least two successive groups of three bits of the data shifted out of shift registers 126, 128 and 130 have at least one bit position corresponding to the detection of darkness by a sensor unit 110. These two groups or words of 3 bits each, each containing at least 1 bit corresponding to a dark condition, are compared with the information in the read only memory 138 and similarly the succeeding pairs of 3 bit words are compared with succeeding positions in the read only memory 138, until a total of 10 words of 3 bits each have been compared with the read only memory. When there is a match with a pattern in the read only memory which designates a valid character, the character is transmitted in binary form to a terminal and the reading process is repeated for the next character. If there is no match with a valid character, a suitable invalid character signal is transmitted to the terminal and the error detection logic signals the operator, such as by flashing a light 15 on the handle 12, to repeat the reading process. When a correct number of valid characters has been detected in accordance with the labelling system, a steady light is indicated on the handle to inform the operator that the process has been completed properly and the next item is ready to be read. In this manner, the characters may be read without careful alignment of the sensors with the characters, and without the use of the slanted or tilted line of sensor units as required by the other embodiment.

While the description above has referred to a hand held reader, the principles of the present invention are also applicable to optical readers which are not hand held. For example, a stationary reader may be provided having a read head and sensor array as described herein for reading tags which may be inserted into a slot in the reader housing. Thus, the tag or other material having characters to be read will be moved relative to a stationary read head.

It will be apparent to those skilled in the art that various changes and modifications may be made within the spirit of the teachings of the present invention. Various modifications may be made in the structure of the hand held optical reader of the present invention. For example, elements other than wheels may be used to provide the spacing function between the read head and the surface being read. For example, smooth surface slider type elements may be used to provide the spacing function. Furthermore, the light source and the photodetectors need not be located within a hollow handle. For example, the optic fibers could extend out of the handle of the hand held optical reader thereby enabling the locating of the light source and the photodetectors in a unit outside of the hand held optical reader per se, such as for example, in a housing located on a counter where the hand held optical reader is being used. Moreover, numerous other circuits will be apparent to those skilled in the art for processing signals developed by the hand held optical reader.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. A hand held optical reader for reading human readable characters on a surface, comprising:

a handle;

a light source for providing light to the surface;

a predetermined number of light detectors;

a read head, said read head being connected to said handle, said read head having mounted therein one end of a predetermined number of optical fibers for transmitting light reflected from said surface to said light detectors; said predetermined number of optical fibers being greater than the number of optical fibers required to read a character; and means for selecting the outputs of said light detectors corresponding to the optical fibers which are used to recognize a character.

2. A hand held optical reader according to claim 1 including means for spacing said read head from said surface.

3. A hand held optical reader according to claim 2 wherein said spacing means comprises two wheels, said wheels being mounted to said read head with their axis of rotation perpendicular to the direction of movement of said read head with respect to said surface.

4. A hand held optical reader according to claim 3 wherein said head is pivotally connected to said handle to permit said handle to pivot in a plane substantially perpendicular to said surface and parallel to said axis of said two wheels thereby enabling the portion of the handle furthest from the pivot point to move in predetermined amounts toward and away from the surface being read without moving said read head.

5. A hand held optical reader for reading indicia on a surface, comprising:

a handle, said handle being provided with a light source and a predetermined number of light detectors;

a read head, said read head being connected to said handle, said read having mounted therein one end of each of first and second set of a predetermined number of optical fibers, said ends of said first and second set of a predetermined number of optical fibers being mounted in said read head so as to be adapted to be in juxtaposition to a surface having indicia to be read, said first set of optical fibers being mounted to transmit light from said light source to said indicia, said second set of optical fibers being mounted to transmit light reflected from said indicia to said light detectors, each one of said second set of optical fibers corresponding to one of said first set of optical fibers to form a set of sensors, the number of sensors exceeding a second predetermined number of sensors required to read indicia; and means for selecting the signal outputs of said second predetermined number of sensors which will be used to recognize the indicia.

6. A hand held optical reader in accordance with claim 5 wherein said first and second sets of optical fibers are mounted in said read head in two parallel rows, said read head being adpated to move over said surface in a direction of scan, said rows of optical fibers mounted in said read head forming an angle with the perpendicular to said direction of scan.

7. A hand held optical reader in accordance with claim 5 wherein said means for selecting the signal outputs of said second predetermined number of sensors comprises means for gating the outputs of said second predetermined number of sensors in response to one of said sensors detecting a portion of the indicia being read.

8. A hand held optical reader in accordance with claim 5 wherein said selecting means comprises a first, a second a third storage means, means for storing the signals of all the sensors corresponding to one side of a character being read in said first storage means, for storing information corresponding to a central portion of the character being read in said second storage means, and for storing information corresponding to the second side of a character being read in said third storage means, and means for comparing the signals stored in said first, second and third storage means with a predetermined signal pattern.

9. A hand held optical reader in accordance with claim 5 wherein said read head is provided with means for spacing said read head from said surface.

10. A hand held optical reader in accordance with claim 9 wherein said spacing means comprises two wheels, said wheels being mounted to said read head with their axis of rotation perpendicular to the direction of movement of said head with respect to said surface.

11. A hand held optical reader in accordance with claim 10 wherein said read head is pivotally connected to said handle to permit said handle to pivot in a plane parallel to said axis of said two wheels.

12. A hand held reader for reading human readable characters on a surface, comprising:

a read head;

a light source means for illuminating a portion of the surface during scanning;

light detector means;

a plurality of sensors each having one of their ends mounted in said read head, each sensor including an optical fiber for directing light reflected from said surface to said detector means, said plurality of sensors being positioned in an array which is greater in height than the height of said characters to be read so that during reading only a predetermined number of said plurality of sensors are used to read said character, the number of said plurality of sensors being greater than said predetermined number, the particular sensors used to read said character depending on the position of said character relative to said array; and means for selecting the predetermined number and particular sensors of said plurality of sensors scanning a character and for determining the identity of said character.

13. An optical reader for reading human readable characters on a surface, comprising:

a light source means for illuminating a portion of the surface during scanning;

a plurality of light detectors;

a read head having a plurality of light sensors mounted thereto for directing light reflected from said surface to said plurality of light detectors, said plurality of light sensors being greater than a predetermined number of sensors required to traverse over and read a character;

means responsive to the outputs of the light detectors corresponding to the predetermined number of sensors which traverses a character for identifying said character, wherein said means responsive comprises a first, a second and a third storage means, means for storing the signals of all the sensors corresponding to one side of a character being read in said first storage means, for storing information corresponding to a central portion of the character being read in said second storage means, and for storing information corresponding to the second side of the character being read in said third storage means, and means for comparing the signal stored in said first, second and third storage means with a predetermined signal pattern.

14. An optical reader in accordance with claim 13 including means for combining a plurality of said sensor units to function as a single sensor unit.

15. An optical reader in accordance with claim 13 including means for enabling a third predetermined number of sensor units to function as a single sensor unit, said means comprising means for applying the outputs of said third predetermined number of light detectors to an OR gate, the output of said OR gate being the output of a sensor unit.

16. A hand held optical reader for reading human readable characters on a surface, comprising:

a handle;

a light source means for illuminating a portion of the surface during scanning;

a predetermined number of light detectors;

a read head, said read head being pivotally connected to said handle for allowing said read head to be maintained substantially parallel to said surface, said read head having mounted therein one end of each of a predetermined number of optical fibers for transmitting light reflected from said surface to said light detectors.

17. A hand held optical reader according to claim 16 including means for spacing said read head from said surface.

18. A hand held optical reader according to claim 17 wherein said spacing means comprises two wheels, said wheels being mounted to said read head with their axis of rotation perpendicular to the direction of movement of said read head with respect to said surface.

19. A hand held optical reader for reading human readable characters on a surface, comprising:

a handle;

a light source means for illuminating a portion of the surface during scanning;

a predetermined number of light detectors;

a read head, said read being pivotally connected to said handle, said read head having mounted therein one end of each of a predetermined number of optical fibers for transmitting light reflected from said surface to said light detectors; and means for spacing said read head a predetermined distance from said surface, said spacing means comprising at least one wheel having an axis of rotation perpendicular to the direction of movement of said read head with respect to said surface, said wheel and pivotal connection allowing said read head to remain substantially parallel to the surface during reading.

20. An optical reader for reading human readable characters on a surface, comprising:

a light source means for illuminating a portion of the surface during scanning;

a plurality of light detectors;

a read head having a plurality of light sensors mounted thereto for directing light reflected from said surface to said plurality of light detectors, said plurality of light sensors being greater than a predetermined number of sensors required to traverse over and read a character;

means responsive to the outputs of the light detectors corresponding to the predetermined number of sensors which traverses a character for identifying said character, wherein said means responsive includes a memory and edge detection circuitry for directing the signals of all the sensors corresponding to one side of a character being read into said memory, the signals of all the sensors corresponding to a central portion of a character being read into said memory, and the signals of all the sensors corresponding to a second side of a character being read into said memory, and means for comparing the signals stored in said memory with a predetermined signal pattern.

* * * * *